UNITED STATES PATENT OFFICE.

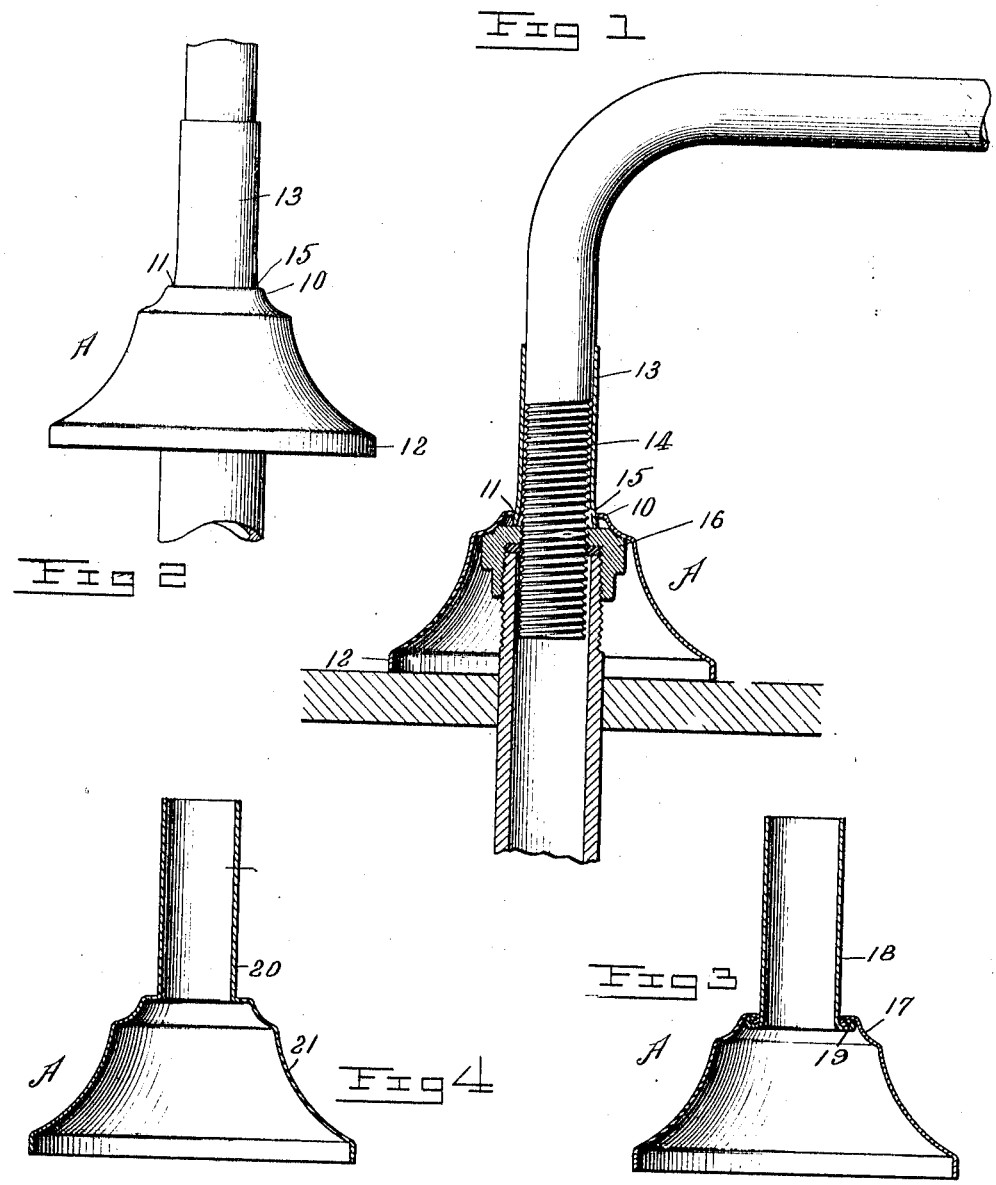

HENRY MUELLER, OF DECATUR, ILLINOIS; ORA B. MUELLER AND ADOLPH MUELLER EXECUTORS OF SAID HENRY MUELLER, DECEASED, ASSIGNORS TO H. MUELLER MANUFACTURING COMPANY, OF DECATUR, ILLINOIS, A CORPORATION OF ILLINOIS.

BOX-FLANGE FOR PIPE-COUPLINGS.

1,039,315.      Specification of Letters Patent.      Patented Sept. 24, 1912.

Application filed July 28, 1910. Serial No. 574,392.

*To all whom it may concern:*

Be it known that I, HENRY MUELLER, a citizen of the United States, residing at Decatur, in the county of Macon and State of Illinois, have invented new and useful Improvements in Box-Flanges for Pipe-Couplings, of which the following is a specification.

My present invention relates to what are generally known in the plumbers' art as box flanges, said flanges being usually employed in connection with water-supply and drain-pipes to make a neat finish at the point where the pipe passes through an opening in a wall, ceiling or floor and by reason of the fact that these flanges are usually cup-shaped or dished they also constitute a housing or covering for joints in the pipes; which joints are, in many instances, unsightly and unless covered or inclosed by a finishing flange or housing detract materially from the general appearance of the connections.

In some classes of plumbing, as now installed, as for instance, in what is known as "open" plumbing, that is, where the pipes are highly polished and exposed, it has become the practice to employ externally threaded pipes upon the threads of which a coupling nut is screwed, which nut constitutes the means for making the coupling joint between the externally threaded pipe and the pipe to which it is connected. In order to provide for the necessary adjustments between these two pipes it is customary to thread the exposed pipe for a considerable part of its length, so much so that at least a portion of said threads will not be covered or housed by the box-flange alone, but will be exposed to such an extent as to render that part of the pipe unsightly and thus detract materially from the finished appearance of the job.

It is the purpose therefore of the present invention to provide a box-flange having associated therewith a finished sleeve or thimble designed to cover or inclose the external threads on the pipe and also cover or inclose the coupling joint, whereby the entire exposed part of the pipe and its fittings will present a neat and attractive appearance.

In the accompanying drawings, which, it will be understood, is merely illustrative of one embodiment of the invention, Figure 1, is a sectional elevation of a supply-pipe shown coupled to a service-pipe and having one form of box-flange made according to my invention fitted thereto. Fig. 2, is a view in elevation of the box-flange shown applied to a supply-pipe. Fig. 3, is a vertical sectional view of a slightly modified form of the invention, and Fig. 4 is a similar view of a further modification.

Referring to the drawings the reference letter A, designates the box-flange proper which is preferably cup-shaped or dished and stamped or spun up from thin sheet metal and which may be of any preferred form, design and finish to make it attractive. The flange has a contracted neck portion 10, preferably having an inturned annular lip 11, and the said flange gradually widens outward toward its lower end where it terminates in a base or rim-portion 12, designed to make contact with the floor, wall or ceiling through which the pipe to which the flange is applied passes.

Associated with the box-flange A, is a sleeve or thimble 13, also of thin metal and of a size to telescope within the opening in the contracted neck-portion 10, of the box-flange, and also of a diameter to closely fit or surround the externally threaded portion of the pipe 14 with which it is associated. The lower end of the sleeve or thimble 13, is flared slightly as at 15, as shown in Fig. 1, in order that the inturned annular lip 11 of the contracted neck-portion will snugly fit the same and thus make a close joint between the parts and prevent the box-flanges from slipping over said flared end although it may be slipped over the opposite end of the sleeve or thimble and may be adjusted longitudinally thereof.

As will be seen by referring to Fig. 1, when the box-flange with its associated sleeve or thimble are applied to a threaded and coupled supply or other pipe 14, the threads as well as the coupling nut 16, will be covered or inclosed thereby, with the result that a neat and attractive appearance will be given the entire structure, and inasmuch as the coupling nut 16, will be covered or inclosed, this nut need not necessarily be polished or finished as is the case when it is exposed to view.

Instead of making the box-flange and sleeve or thimble of separable parts that are adjustable relatively to each other as illustrated in Fig. 1, they may be fixed or seamed one to the other or made integral, as illustrated in Figs. 3 and 4. In Fig. 3, where these two parts are seamed together, the reference numeral 17 designates the box-flange, 18, the sleeve or thimble and 19, the seam connecting the two together. In Fig. 4, the sleeve or thimble 20, is, as shown, formed integral with the box-flange 21.

While I have shown and described my improved box-flange as being especially adapted for use in connection with supply and service pipes it will be understood of course that I do not limit myself to this use, as the invention will be found to be serviceable in other pipe connections.

What I claim is:

1. In combination with a section of pipe, a second section of pipe adapted to telescopically engage with said first mentioned section, and a coupling nut for adjustably securing together the sections, of a flange box adapted to conceal the joint, said flange box comprising a dished member having a relatively broad base and a contracted open neck, and a sleeve adapted to envelop one of said pipe sections and to contact with said coupling nut whereby displacement in one direction may be prevented, said sleeve also being flared at one end whereby displacement in an opposite direction is prevented.

2. The combination with a flange box having a relatively broad base, a contracted open neck and an inturned annular lip bordering said neck, of a relatively long sleeve removably fitted in the open neck of said flange box and adjustable longitudinally therethrough, said sleeve being flared at one end to engage the lip on said flange box whereby it is secured against withdrawal therefrom in one direction.

3. As a new article of manufacture, a fitting for a pipe coupling comprising a dished member having a relatively broad base and a contracted open neck, and a relatively long sleeve removably fitted therein and adjustable longitudinally thereof, said sleeve being flared at one end, the flared portion of said sleeve forming the sole means for maintaining engagement between the same and said fitting.

In testimony whereof I have hereunto set my hand in presence of two subscribing witnesses.

HENRY MUELLER.

Witnesses:
WILLIAM R. GUSTIN,
WILLIAM R. BIDDLE.